Jan. 20, 1931  E. C. NEWCOMB  1,789,535
TWO-CYCLE ENGINE
Filed April 20, 1928

INVENTOR
Edward C Newcomb
BY
Jeffery Kimball Eggleston ATTORNEY

Patented Jan. 20, 1931

1,789,535

UNITED STATES PATENT OFFICE

EDWARD C. NEWCOMB, OF NORTH SCITUATE, MASSACHUSETTS

TWO-CYCLE ENGINE

Application filed April 20, 1928. Serial No. 271,445.

The invention is an improved combustion space for variable speed two-cycle engines of the carburetor type and its object is to improve the fuel economy of such engines and, more especially, it is an improvement on the combustion space of my prior patent, Reissue 16,108, granted July 7, 1925.

Figure 1:
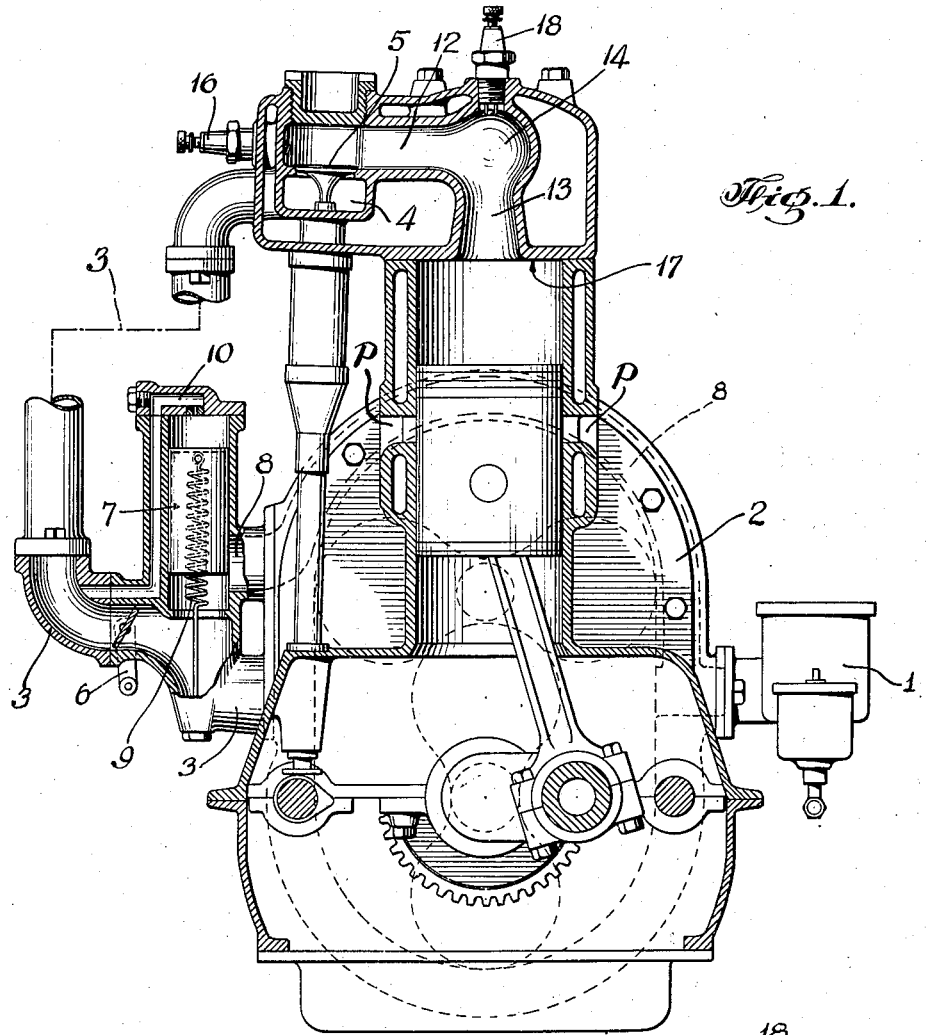
Figure 2:
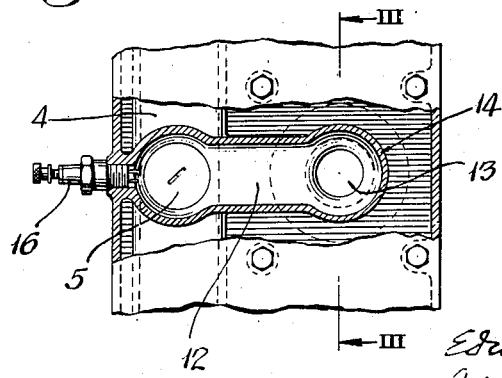

In the accompanying drawing, Fig. 1 is a vertical cross section of an engine, partly in diagrammatic arrangement, provided with the new combustion space;

Fig. 2 is a plan thereof with said space in section; and

Figure 3:
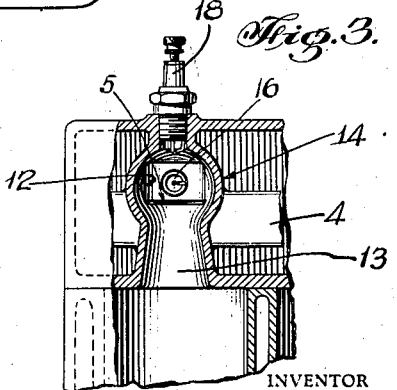

Fig. 3 a longitudinal section.

The essential construction of the engine shown will be recognized without description. Fuel mixture is supplied by carburetor 1 to a rotary engine-driven blower 2 shown partly in dotted lines, and delivered by the latter through inlet pipe 3 to the manifold 4, which may be common to several cylinders, as indicated. From the manifold the mixture enters by mechanically-operated inlet valve 5 into the combustion space. Control and variation of the rate of fuel admission is accomplished by throttle 6 supplemented by a piston-type valve 7, controlling a return passage 8 (dotted lines) leading back to the blower intake. The return valve 7 is subject to the constant load of a spring 9 and to a variable load imparted thereto through a pressure communication 10 between the top of the valve chamber and the manifold on the combustion side of the throttle 6, so that the rate of flow through the return pass 8 is affected by the manifold pressure. This principle of mixture supply forms the subject of a companion application Serial Number 273,096, filed April 26, 1928, and is not claimed herein; it serves to provide a proper supply to the engine for all conditions of load and speed and, for the purpose of the present invention, can be substituted by any other mixture supply system adapted for this result. The exhaust ports P are uncovered by the piston at the end of its stroke and a suitable exhaust pipe will be understood as provided.

The combustion space is relatively wide or equal to the cylinder diameter in its part nearest the exhaust ports and in its part which is remote from such ports it is elongated and relatively narrow. The clearance is constituted almost entirely by the narrow part which is composed of a transversely disposed passage 12 communicating at an angle of about 90° with a longitudinal passage 13, which opens directly into the cylinder space in substantial alignment with the cylinder axis. Both passages are of relatively small cross area, as shown, the transverse passage 12 being conveniently of rectangular section and the other circular, and their junction is formed by a slight enlargement 14 of bulbous shape. The transverse passage, termed the ignition passage, approximates the length of the piston stroke or is somewhat longer, while the other, termed the directing passage, can be shorter, or about one-half that length, as indicated, but is in any event long enough to give direction to the entering mixture; both together constitute an elongated compression or clearance space giving a compression ratio to the engine of about 3.9. The entire combustion space is waterjacketed or otherwise externally cooled so that ignition cannot occur from wall temperature. The inlet end of the ignition passage is slightly enlarged as shown in Fig. 2, but no more than necessary to provide adequate flow space around the valve head, and to accommodate the valve cover.

By reason of the shape of the clearance space and the location of the inlet valve and the igniter 16 at the end thereof most remote from the exhaust ports, the advantages explained in my prior patent are obtained, that is to say, the entering charge mixture acts to expel the gases of the previous combustion with the least tendency to mix therewith and become diluted thereby, small charges of entering mixture being retained during compression in proximity to the igniter where they are certain to be fired, thus enabling the engine to operate with efficient combustion for part throttle work.

As explained in the patent, a principal function of the longitudinal or directing passage is to give an axial direction to the fresh charge entering the wide or cylinder portion of the combustion space, so that it has little or no tendency to cut across and escape through an exhaust port or to mix unduly with the residual gases, thus affording a good fuel economy at high as well as low loads. The mixture entering by the passage 12 is assumed to have different velocities in its different parts, due to its manner of introduction, and by its impingement on the inclined surface of the junction chamber 14, the mixture flow in passage 12 acquires a more uniform velocity, over its whole cross area so that when directed into the cylinder space, it creates minimum turbulence therein. The shape and relative size of the directing passage shown in the patent is efficient for carrying out this purpose to a remarkable degree, but I have found that even better efficiency can be secured with a smaller cross area of that passage where it joins or enters the cylinder space and accordingly, the present invention consists in shaping said passage so that it is more nearly of uniform cross area, from end to end, and of materially less diameter than the space to which it delivers, thus producing an abrupt change of diameter of the combustion space at this point. Such passage may be of exactly equal cross area throughout its length, i. e., it may be cylindrical, but it is preferably slightly conical or divergent toward the piston as indicated in the drawing, thus tending to produce a point of greatest restriction at the upper end of the passage where it joins the bulbous chamber. The diameter at the lower end is in any event much less than the cylinder, say approximately one-half of the cylinder diameter, and the passage makes a fairly sharp corner with the cylinder end wall 17 as distinguished from the wide flare of the prior patent. This reduced diameter of the directing passage produces a more orderly expulsion of the residual burnt gases and a corresponding substantial improvement in fuel economy.

It has been found also that the combustion process is enhanced by the use of an auxiliary coincidently energized spark plug and that the location of such plug giving the greatest gain, is at the top of the bulbous junction, as indicated at 18, and the invention therefore includes the location of such plug at this particular point in the type of clearance space above described.

Claims.

1. In a two-cycle engine, the combination of the engine cylinder having an exhaust port uncovered by the piston and an externally cooled combustion space which is relatively narrow in the part thereof remote from the exhaust port and relatively wide in the part thereof nearest said port—the junction between wide and narrow parts being abrupt, and said narrow part comprising a relatively long transverse passage and a stream line longitudinal flow directing passage directly connecting with said wider part, both passages being of cross area materially less than that of said wide part, an inlet valve and igniter at the end of said narrower part most remote from the exhaust port and means for supplying variable charges of combustible mixture through said inlet valve.

2. In a two-cycle engine, the combination of the engine cylinder having an exhaust port uncovered by the piston and an externally cooled clearance space constituted by a relatively long ignition passage of small cross area, communicating at an angle with a stream line longitudinally disposed flow directing passage also having a small cross area and which area for all of the length of said directing passage is materially less than that of the cylinder part of said clearance space into which it opens, an inlet valve and igniter at the end of said ignition passage most remote from the cylinder and means for supplying variable charges of combustible mixture through said inlet valve.

3. In a two-cycle engine, the combination of the engine cylinder having an exhaust port uncovered by the piston and an externally cooled clearance space constituted by a transverse, relatively long ignition passage of small cross area, a bulbous junction and a stream line longitudinal flow directing passage opening into the cylinder space, the cross area of said directing passage at all points of its length being less than the cross area of the cylinder part of said clearance space into which it opens, an inlet valve and igniter at the end of said ignition passage most remote from the exhaust port, and means for supplying variable charges of combustible mixture through said inlet valve.

4. In a two-cycle engine, the combination of the engine cylinder provided with an exhaust port uncovered by the piston and with an externally cooled clearance space constituted by a long, transverse, ignition passage of small cross area having a bulbous junction with a steam line longitudinal flow directing passage opening into the cylinder space, the diameter of said directing passage at its point of connection with the cylinder space being approximately half the diameter of said space, an inlet valve and igniter at the end of said ignition passage most remote from the exhaust port and means for supplying variable charges of combustible mixture to said inlet valve.

5. In a two-cycle engine, the combination of the engine cylinder provided with an exhaust port uncovered by the piston and with an externally cooled clearance space constituted by a long, transverse ignition passage of small cross area having a bulbous junction with a steam line longitudinal flow directing passage opening into the cylinder space, said directing passage being slightly divergent from said junction to said cylinder space and at its point of opening into said cylinder space being of about half the cylinder diameter, an inlet valve and igniter at the end of said ignition passage most remote from the exhaust port and means for supplying variable charges of combustible mixture to said inlet valve.

6. In a two-cycle engine, the combination of the engine cylinder provided with an exhaust port uncovered by the piston and with an externally cooled clearance space constituted by a transverse, relatively long ignition passage of small cross area connecting with the cylinder through a stream line longitudinal flow directing passage of about half the length of said ignition passage, the diameter of said directing passage at all points of its length being about half the diameter of the cylinder space into which it opens, an inlet valve and igniter at the end of said ignition passage most remote from the exhaust port and means for supplying variable charges of combustible mixture to said inlet valve.

In testimony whereof, I have signed this specification.

EDWARD C. NEWCOMB.